(12) United States Patent
Hilss et al.

(10) Patent No.: US 7,140,476 B2
(45) Date of Patent: Nov. 28, 2006

(54) HAND BRAKE LEVER

(75) Inventors: Dirk Hilss, Lautertal (DE); Michael Heinrich Schreier, Heidenrod (DE)

(73) Assignee: General Motors Corporation, Detroit, MI (US)

( * ) Notice: Subject to any disclaimer, the term of this patent is extended or adjusted under 35 U.S.C. 154(b) by 46 days.

(21) Appl. No.: 10/853,739

(22) Filed: May 25, 2004

(65) Prior Publication Data

US 2004/0237701 A1 Dec. 2, 2004

(30) Foreign Application Priority Data

May 27, 2003 (DE) .................. 103 24 040

(51) Int. Cl.
*B60T 7/10* (2006.01)

(52) U.S. Cl. .................... 188/265; 74/525; 74/536

(58) Field of Classification Search ............. 74/525, 74/502, 518, 535, 536, 537, 538; 188/31, 188/265; 192/219.5
See application file for complete search history.

(56) References Cited

U.S. PATENT DOCUMENTS

| 4,138,905 | A | * | 2/1979 | Konishi | ............ 74/577 R |
|---|---|---|---|---|---|
| 4,311,060 | A | * | 1/1982 | Kawaguchi et al. | .......... 74/142 |
| 4,876,914 | A | * | 10/1989 | Kanno | ............ 74/538 |
| 5,819,595 | A | * | 10/1998 | Cebollero | ............ 74/535 |
| 5,950,496 | A | * | 9/1999 | Rampp | ............ 74/538 |
| 6,016,718 | A | * | 1/2000 | Park et al. | ............ 74/538 |
| 2004/0089094 | A1 | * | 5/2004 | Cho | ............ 74/538 |
| 2004/0237701 | A1 | * | 12/2004 | Hilss et al. | ............ 74/525 |

FOREIGN PATENT DOCUMENTS

| DE | 2104687 | * | 8/1972 |
| DE | 3529696 | * | 3/1986 |
| DE | 4029229 | * | 4/1991 |
| DE | 10324040 A1 | * | 1/2005 |
| EP | 0607021 | * | 7/1994 |
| GB | 2299844 | * | 10/1996 |

* cited by examiner

*Primary Examiner*—James McClellan
*Assistant Examiner*—Bradley King
(74) *Attorney, Agent, or Firm*—Laura C. Hargitt

(57) ABSTRACT

A hand brake lever, especially for a motor vehicle, includes at least two tubes (2, 3) telescopically inserted into each other for actuating a locking device (5) of a parking brake. The tubes (2, 3) automatically lock in any pulled-out position and actuation of a device corresponding to the tubes (2, 3) causes the release of the locking device (5).

16 Claims, 2 Drawing Sheets

HAND BRAKE LEVER

FIELD OF INVENTION

Figure 1:
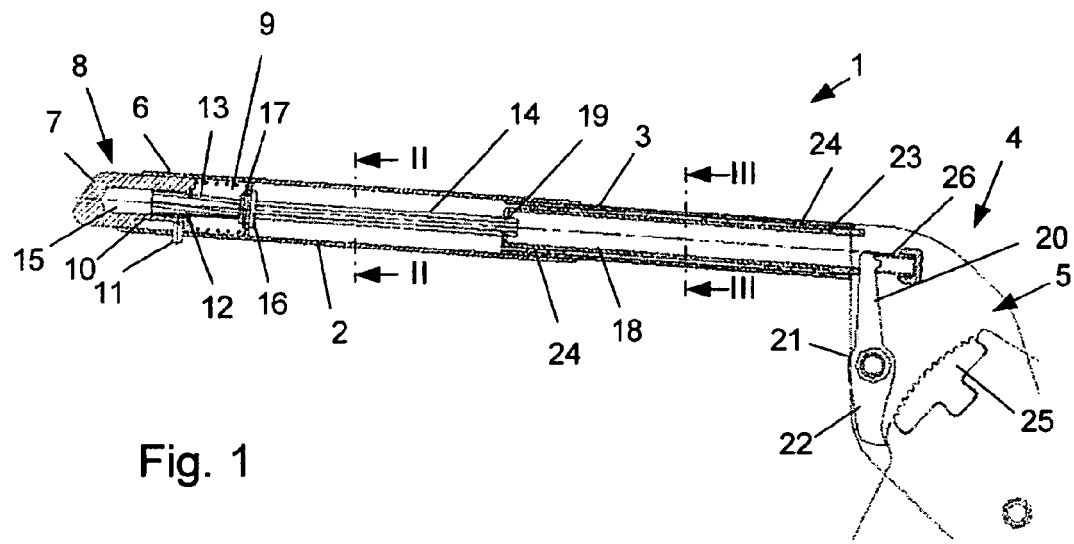

The invention pertains to a hand brake lever, especially for a motor vehicle, with at least two tubes guided telescopically one into the other for actuating a locking device of a manual parking brake.

Due to the requirement of a more flexible use of the interior space of a motor vehicle the configuration of the vehicle tunnel is gaining increasingly greater significance. An obstacle to the flexible utilization of the central tunnel, e.g., as a passage to the rear row of seats or for placing storage compartments, however, is the position of the hand brake lever. As a possible space for an arrangement of a hand brake lever the region on the left next to the driver's seat comes into consideration. However, getting in and out of the vehicle may be impeded by positioning the hand brake lever in this location, depending on the position of the driver's seat and the length of the hand brake lever. Positioning the hand brake lever more rearward, in turn, makes its operation more difficult.

DE2 104 687 A1 discloses an activation lever in a motor vehicle which displays at least two tubes guided telescopically one into the other which are pulled into each other by a spring. The disadvantage in this case, however, is the fact that the driver, in order to operate the actuation lever, must pull the lever out against the force of the spring before he executes the braking operation.

In DE 35 29 696 C2 a parking brake handle formed as a pull rod is installed in the central tunnel of a vehicle which therefore requires space in the region of the central tunnel, for which reason the flexibility of the design of the interior in this area is strongly limited.

A driver's seat with operating levers for a motor vehicle is known from DE 40 29 229 A1 in which, however, the problem arises that especially when the hand brake lever is positioned next to the driver's seat getting in and out of the vehicle is very difficult, and the hand brake lever can cause the driver to stumble.

In addition EP 0 607 021 B1 discloses a hand brake for a trailer, which trailer hand brake handle is telescopically designed. The trailer hand brake handle is in the retracted position when the brake is released and is moved into an extended position to operate the hand brake. The retracted position is achieved through the action of a tension spring so that the operator of the trailer hand brake handle must first extend the hand brake handle against the force of the spring before he can operate the hand brake.

It is the objective of the invention to devise a hand brake lever of the type mentioned initially which assures a flexible configuration of the vehicle interior.

According to the invention the problem is solved by the fact that in each extended position the tubes automatically are held stationary and actuation of a device coordinated with the tubes releases the locking device.

On the basis of these measures it is possible to position the hand brake lever both in the left front region next to the driver's seat and also move it to the left rear next to the driver's seat and configure the interior of the vehicle flexibly in this next. Due to the telescoping capacity of the hand brake lever in every extended position in which the locking device is to be released it is not absolutely necessary to arrange the hand brake lever in the region of the central tunnel so that it can easily be reached and activated by the driver. In addition it is not necessary to pull the hand brake lever out laboriously against the force of a spring in order to release the parking brake by actuating the device coordinated with the tubes. Rather the parking brake can be released in any desired extended position of the telescoping tubes. Therefore the driver can extend the tubes as far as seems necessary or convenient for him such that the tubes automatically lock in the chosen extended position due to frictional forces. As a result of the optional telescopability of the tubes, on the one hand, a lever arm for setting the parking brake can be adjusted with a relatively low actuation force, and on the other hand, the length of the hand brake lever can be adjusted so as to avoid a disturbing effect by the hand brake lever, especially in the interior of the vehicle, while in each case of length adjustment the release of the parking brake is assured.

The device preferably includes a rod for actuation of the locking device which is mounted non-rotatably but capable of movement in an opening of at least one inner tube guided in the tubes. Preferably the rod has a rectangular cross section. Advisedly the opening is formed in an end side facing an actuation element of the device of the inner tube corresponding to the cross section of the rod. The rod provided with the rectangular cross section is capable of sliding in the opening in its axial direction, such that a frictional resistance may be present between the rod and the opening. The rod assures the actuation of the locking device for releasing the parking brake through the telescoping region of the tubes, since the rod, when the tubes are pushed together or pulled apart, is pushed into the inner tube or is partially pulled out of the inner tube.

According to an advantageous variant of the invention the rod has a twisted attachment which collaborates with the actuation element. Via the twisted attachment the rod and therefore also the inner tube is set into rotational motion according to the acting principle of a boring drill in the case of translational displacement of the actuation element.

In order to mount the rod rotating but non-sliding relative to the actuation element it is preferred to arrange the twisted attachment on the side of the rod facing toward the actuation element and mount it rotatably but non-sliding in an extension of the tube, in which case the actuation element is held in the extension nonrotating but sliding.

For nonrotating but sliding mounting the actuation element is preferably provided with external longitudinal side geometry corresponding to an inner geometry of the extension. The outer geometry of the actuation element and the inner geometry of the extension may, for example, have a rectangular cross section.

Alternatively to this the actuation element may be mounted nonrotating but sliding in a boring of the extension. In this case, for example, a lug can be shaped on the actuation element which engages a groove of the extension to secure it against rotation. Naturally also a rotational safety, e.g., a screw inserted in the extension can also engage the actuation element for nonrotating and sliding mounting.

Advisedly the twisted attachment is bounded on its side facing away from the actuation element by an annular shoulder lying on an end side of a boring of the extension, in which case a safety ring is braced on the opposite side. The annular shoulder may be a component of a so-called flange bushing which is pressed onto the rod and which displays a recess for the safety ring.

The actuation element is preferably designed as a push button with an orifice for actuation of the twisted attachment of the rod. To reduce wear the orifice, e.g., is made of a hardened steel and is inserted nonrotationally in the push button consisting of a plastic or is injected into it.

For the nondetachable holding of the push button the extension is assigned a limiter designed as a threaded pin for the end rest of the spring loaded push button. The spring loading of the push button causes the latter to rebound from its actuated end position into the unactuated end position, at which time in parallel with the rebound, because of the twisted attachment collaborating with the push button, both the rod and the inner tube undergo rotary motion, and the locking device is unloaded in such a way that a locking of the parking brake can take place. Because of the threaded rod the push button can also be rapidly and simply mounted at the time of the installation of the hand brake lever. This also constitutes a very simple design for axial limitation of the push button.

The threaded rod preferably engages a groove running in the direction of the longitudinal axis of the push button or it strikes against a corresponding flattened part on the push button. A groove is incorporated in the push button especially when the push button is not held nonrotationally in the extension because of its outer geometry. By interaction of the threaded rod with the push button sliding of the push button in the direction of the longitudinal axis of the tubes is possible, while its rotation is prevented. In addition a locking safety is provided for the push button.

In order to achieve an axially true rotation of the inner tube advisably the inner tube is mounted so as to rotate around its longitudinal axis.

According to an advantageous variant of the invention, the end side of the inner tube facing away from the actuation element is beveled toward its longitudinal axis for releasing the locking device. In the case of rotation of the inner tube caused by the actuation of the push button the beveled end side acts on the locking device with a wedging action to cause its release.

Advisably the beveled end side of the inner tube acts on a rotatably mounted lock pawl of the locking device against the action of a compression spring. If the push button is pressed to release the parking brake, the orifice exerts a torque on the twisted attachment of the rod so that the inner tube executes a rotation around its longitudinal axis and therefore because of its beveled end side the lock pawl is released from the catch corresponding to it which it was held under a spring load.

Advantageously the tube displaying the inner tube is mounted on a swiveling device on one side. The swiveling device forms a bending moment-absorbing grip holder for the hand brake lever and simultaneously serves as a thrust support for absorbing pushing and pulling forces when the hand brake lever is pushed together or pulled apart. In addition the swiveling device actuates the parking brake via coordinated brake cables.

In order to mount the inner tube both axially and radially, at least one mounting ring is arranged between the inner tube and the tube.

It goes without saying that the features described above as well as below can be used not only in the combinations reported in each case but also in other combinations. The scope of the present invention is only defined by the claims.

Figure 2:
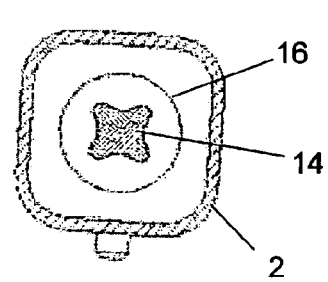
Figure 3:
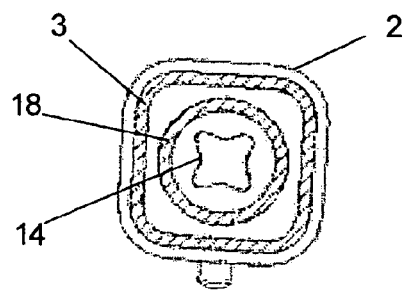
Figure 4:
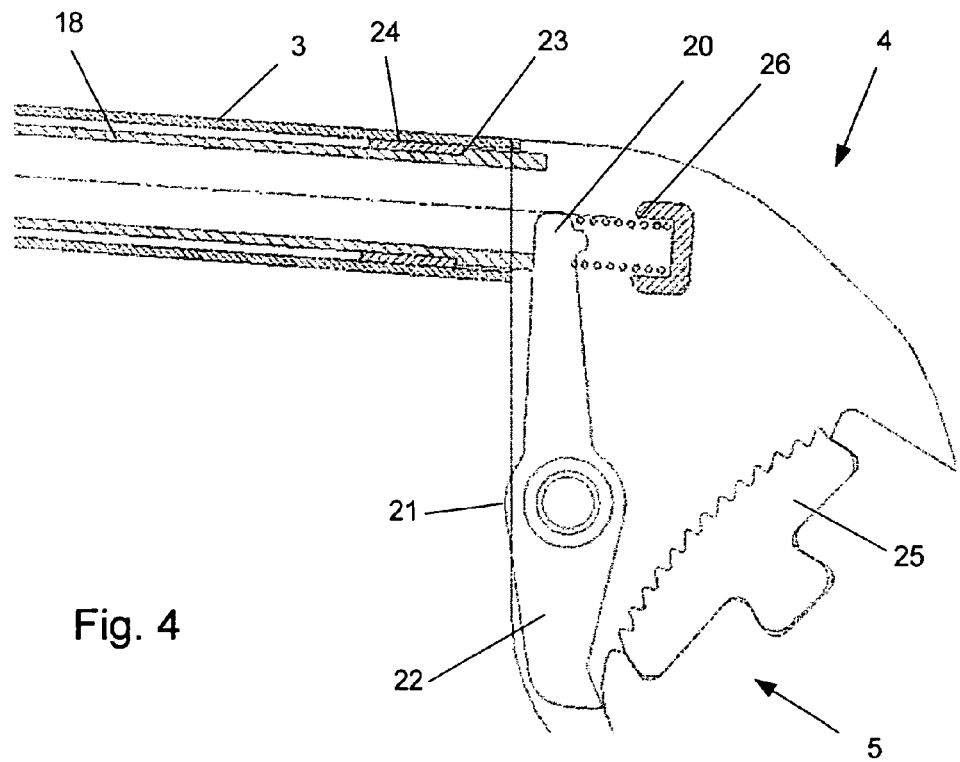
Figure 5:
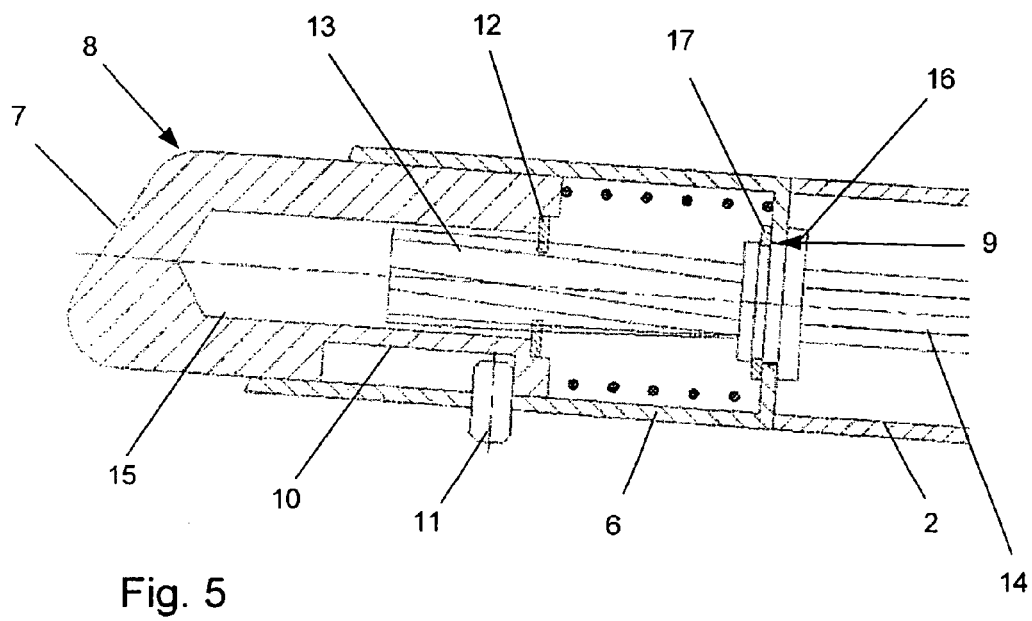

The invention is explained in the following with reference to an example of embodiment with reference to the attached drawings, in which:

FIG. 1 is a longitudinal section through a hand brake lever according to the invention, FIG. 2 is a cross section through the hand brake lever according to FIG. 1 along line II—II, FIG. 3 is a cross section through the hand brake lever in FIG. 1 along line III—III, FIG. 4 is an enlarged sectional representation of the end region coordinated with a locking device of the hand brake lever according to FIG. 1 and FIG. 5 is an enlarged sectional representation in the region of an actuation element of the hand brake lever in FIG. 1.

The hand brake lever 1 includes two telescoping nonrotating tubes 2, 3, the inner tube 3 being coordinated with a swiveling device 4 with a locking device 5, and the outer tube 2 at its free end carries an extension 6 for holding an actuation element 8 designed as a push button 7. The extension 6 in cross section has a rectangular internal geometry into which the push button 7 having the corresponding outer geometry is inserted capable of sliding.

To limit the end positions of the push button 7 the latter is provided with a flattened part 10 running in its longitudinal direction which is coordinated with a threaded pin 11 screwed into the extension. The push button 7 carries at its end inserted into the extension 6 a nonrotating orifice 12 for guiding a twisted attachment 13 of a rod 14 of rectangular cross section, said attachment 13 extending into a longitudinal boring 15 of the push button 7. The twisted attachment 11 is bounded with respect to the rod 14 guided in boring 9 by annular shoulder 16, and the boring 9 may be formed in a bushing pressed into the extension 6. The annular shoulder 16 is located on the tube-side end of the extension 6, and inside the extension 6 a safety ring 17 is affixed on the attachment 13 in such a way that the rod 14 is held rotatably in extension 6.

In the inner tube 3 of the two nonrotationally telescoping tubes 2, 3 an inner tube 18 is mounted rotatably which has on its end side facing the push button 7 an opening 19 for sliding but nonrotating holding of the rod 14. The end side of the inner tube 18 facing away from push button 7 is beveled and acts on a first lever arm 20 of a rotatably mounted lock pawl 21 of the locking device 5 which is actuated by a compression spring 26 against the inner tube 18. Further the lock pawl 21 collaborates via a second lever arm 22 with a toothed catching element 25 of the locking device 5. In order for the inner tube 18 not to be pushed in the direction of the push button 7 it has an offset/recess 23 on which a ring bearing for the inner tube 18 lies inserted in the inside tube 3, a second ring bearing 24 is arranged in the region of the opening 19 of the inner tube 18.

To actuate a parking brake, not shown in more detail, the two tubes 2, 3 are telescoped to a desired length of the hand brake lever 1. At this time the rod 14 slides in the opening 19 of the inner tube 18. When the parking brake is tightened, the second lever arm 22 of the lock pawl 21 engages the toothed catching element 25, and the first lever 20, because of its compression spring loading, is pressed against the beveled end face side of the inner tube 18. To release the parking brake it is first necessary to nullify the locking action of the locking device 5. This is accomplished by the translational actuation of the push button 7, at which time the orifice 12 is pushed over the twisted attachment 13 of the rod 14 so that the rod 14 experiences a rotational motion which is transmitted through the opening 19 to the inner tube 18. The beveled end side of the inner tube 18 causes a wedging effect on the corresponding lever arm 20 of the lock pawl 21 which executes thereupon a rotary motion against the compression spring force acting on it until the lever arm 22 of the lock pawl 21 coordinated with the toothed catching element 25 disengages from the catching element 25. The release of the parking brake is accomplished by subsequently swiveling the hand brake lever 1. The collaboration of the rod 14 of rectangular cross section displaying twisted attachment 13 with the inner tube 18 assures that the locking device 5 can be released regardless of how far the hand brake lever 1 is pulled out.

Sufficient friction exists between the tubes 2, 3 and between the rod 14 and the inner tube 18 to provide a sliding friction lock that automatically locks the lever 1 at the telescoped length that seems necessary and convenient to the driver.

The invention claimed is:

1. Hand brake lever, for a motor vehicle in which a brake locking device (5) has a pivoted lock pawl (21) that engages with a toothed catch element (25) to maintain a tightened condition of the brakes and the lock pawl (21) disengages from the toothed catch element (25) to release the tightened condition of the brakes, comprising:

a lever (1) having at least two tubes (2, 3) telescoping into each other to adjust the length of the lever (1), the first tube (2) having a free end for actuation by the driver and the second tube (3) being connected to the locking device (5);

an actuation element (8) mounted on the free end of the first tube (2) for actuation by the driver;

and a device including a rod (14) and an inner tube (18) located inside the tubes (2, 3) of lever (1) and connected with one another in a manner causing rotation of the rod (14) and the inner tube (18) together when the actuator (8) is actuated by the driver, but permitting the rod (14) to telescope with the inner tube (18) during the telescoping of the first and second tubes (2, 3) by the driver to adjust the length of the lever (1), and further acting to release the lock pawl (21) from the toothed catch element (25) upon the rotation of the rod (14) and inner tube (18).

2. Hand brake lever as in claim 1, wherein the rod (14) has a non-circular cross section.

3. Hand brake lever as in claim 1, wherein an opening (19) is formed in an end side of the inner tube (18) and closely fitted to the cross section of the rod (14) to permit telescoping of the rod (14) and inner tube (18) relative one another and also lock the rod (14) and inner tube (18) for rotation together.

4. Hand brake lever as in claim 1, wherein the rod (14) has a twisted attachment (13) which engages with the actuation element (8) to cause rotation of the rod (14) when the actuation element (8) is actuated by the driver.

5. Hand brake lever as in claim 4, wherein the twisted attachment (13) is arranged on the side of the rod (14) facing the actuation element (8) and is mounted in a rotating but not sliding manner in an extension (6) of the tube (2), the actuation element (8) being held in a nonrotating but sliding manner in the extension (6).

6. Hand brake lever as in claim 5, wherein the actuation element (8) is provided with an outer geometry on the longitudinal side for nonrotating but sliding mounting corresponding to an inner geometry of the extension (6).

7. Hand brake lever as in claim 5, wherein the actuation element (8) is mounted in a nonrotating but sliding manner in a boring of the extension (6).

8. Hand brake lever as in claim 4 wherein the twisted attachment (13) on its side facing away from the actuation element (8) is bounded by an annular shoulder (16) lying against an end side of a boring (9) of the extension (6), and that a safety ring (17) is braced on the opposite side.

9. Hand brake lever as in claim 4 wherein the actuation element (8) is a push button (7) with an opening (12) for actuation of the twisted attachment (13) of the rod (14).

10. Hand brake lever as in claim 9, wherein a limiter for the end positions of the spring-loaded push button (7) is a threaded pin (11) engaging with the extension (6).

11. Hand brake lever as in claim 10, wherein the threaded pin (11) engages a groove (10) running in the direction of the longitudinal axis of the push button (7) or butts against a corresponding flattened part of the push button (7).

12. Hand brake lever as in claim 1 wherein the inner tube (18) is mounted within the second tube (3) for rotating around its longitudinal axis.

13. Hand brake lever as in claim 3 wherein the end side of the inner tube (18) facing away from the actuation element (8) is beveled towards its longitudinal axis for releasing the locking device (5).

14. Hand brake lever as in claim 1 wherein the inner tube (18) has a beveled end side that acts on the pivotally mounted lock pawl (21) of the locking device (5) against the action of a compression spring (26).

15. Hand brake lever as in claim 1 wherein at least one ring bearing (24) is arranged between the inner tube (18) and the at least one of the telescoping tubes (2,3).

16. Hand brake lever as in claim 1 wherein the tubes (2, 3) have sufficient sliding friction there between so as to frictionally lock the tubes (2, 3) at whatever adjusted telescoped length of the tubes (2, 3) is set by the diver.

* * * * *